July 29, 1941.  T. E. TORKELSON  2,250,847
ELECTRICAL ACCUMULATOR
Filed May 14, 1938  2 Sheets-Sheet 1
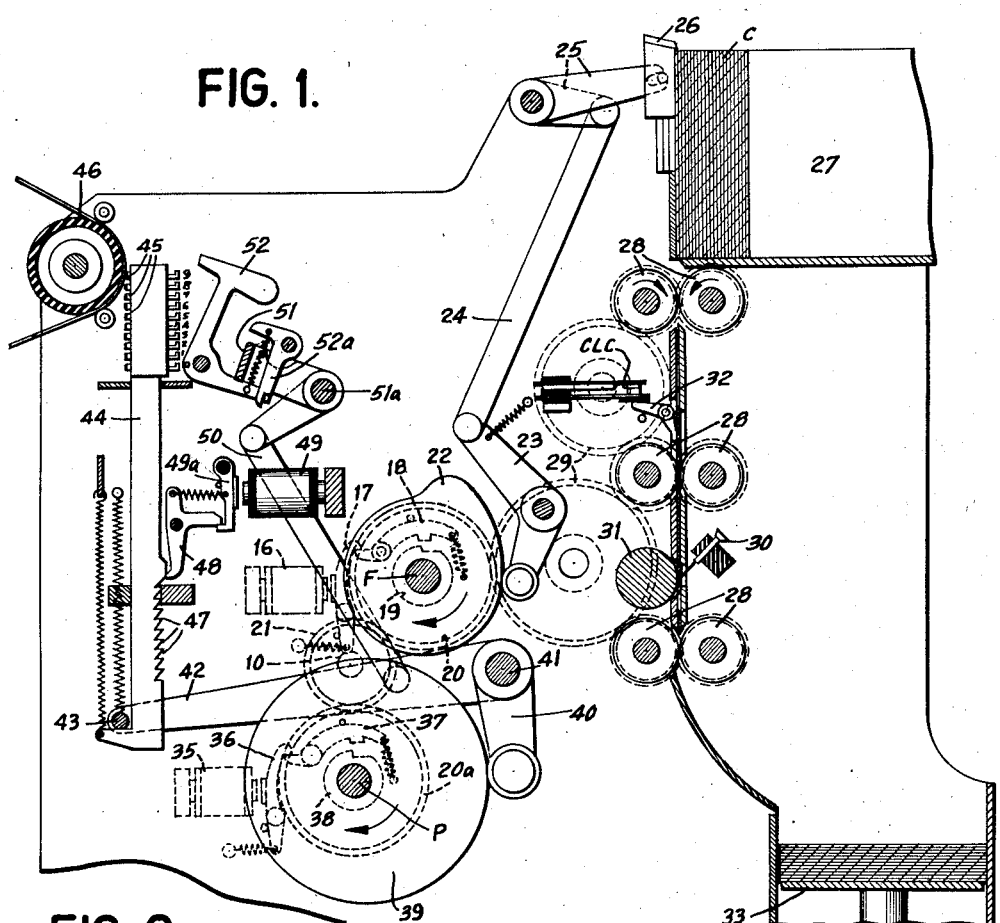
FIG. 1.
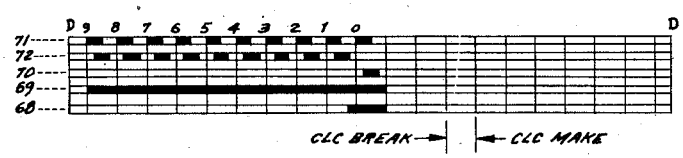
FIG. 3.
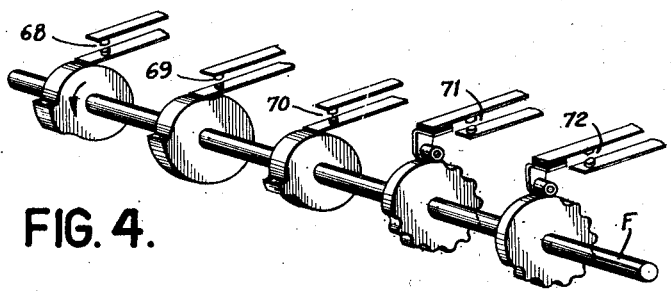
FIG. 4.
FIG. 5.
INVENTOR
Torkel E. Torkelson
BY
W. M. Nelson
ATTORNEY Patented July 29, 1941

2,250,847

UNITED STATES PATENT OFFICE 2,250,847

ELECTRICAL ACCUMULATOR

Torkel E. Torkelson, Baldwin, N. Y., assignor to International Business Machines Corporation, New York, N. Y., a corporation of New York Application May 14, 1938, Serial No. 207,977

9 Claims. (Cl. 235—61.6)

This invention relates to record controlled accounting machines and, more particularly, to electrical accumulators employed in such machines.

The principal object of the present invention resides in the provision of a novel accumulator of the strictly electrical type and means to apply the same to a record controlled accounting machine.

Other objects of the invention include the provision of means to energize successively a series of relays by multiple impulses representing a value entered in said series; the provision of means by which each relay, upon being energized, prepares the next relay in the series for energization and concurrently renders the previous relay in said series ineffective; the provision of means to maintain the last energized relay of the series in an operated condition; and the provision of an entry control means, independent of the duration of the impulses, to limit the sequential advance of the relay series to one relay for each impulse.

According to the invention, a record controlled accounting machine is provided with a record sensing means to detect value designations on a record and to control thereby an impulse initiating circuit so as to impress a number of impulses corresponding to each sensed value on an entry circuit to a series of relays, thus causing said relays to be successively energized, the last relay energized in each series representing the value entered therein. Holding circuits are provided to maintain the last-energized relay in each series in its operated condition until a subsequent sensing cycle causes the energization of the next higher relay in the series. Each relay of the series, upon being operated, conditions the next higher relay in the series for operation upon entry of the next impulse and concurrently breaks the holding circuit to the previous relay. Consequently one and only one relay in each series is maintained energized at a time.

Each series of relays becomes a denominational order of the accumulator and it is obvious that any convenient number of series may be utilized according to the requirements of the accounting work to be done. Transfer means is then provided to take care of the overflow from lower orders into next higher orders when said lower orders pass from "9" to "0." Since only one of the relays of each orders remains energized at a time, a simple read-out means is provided including extra contacts associated with each of the accumulator relays which, when operated, condition circuits for total printing the amounts standing in the accumulator. Resetting of the accumulator is accomplished electrically by a simple means whereby the holding circuits to all relays are broken, thus wiping out instantaneously the amounts previously standing in the accumulator. After the resetting operation, the first relay in each denominational order of the accumulator becomes automatically energized and serves to represent a zero reading in that order.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 1 is a sectional view of an accounting machine showing the location of the various units and drive mechanism.

Fig. 3 is a timing chart for the circuit diagram shown in Fig. 2.

Fig. 4 is a perspective view of the feed shaft designated "F" in Fig. 1 showing the locations of the various contact operating cams utilized in the machine operation.

Fig. 5 is a view showing a portion of the record card.

Figure 2:
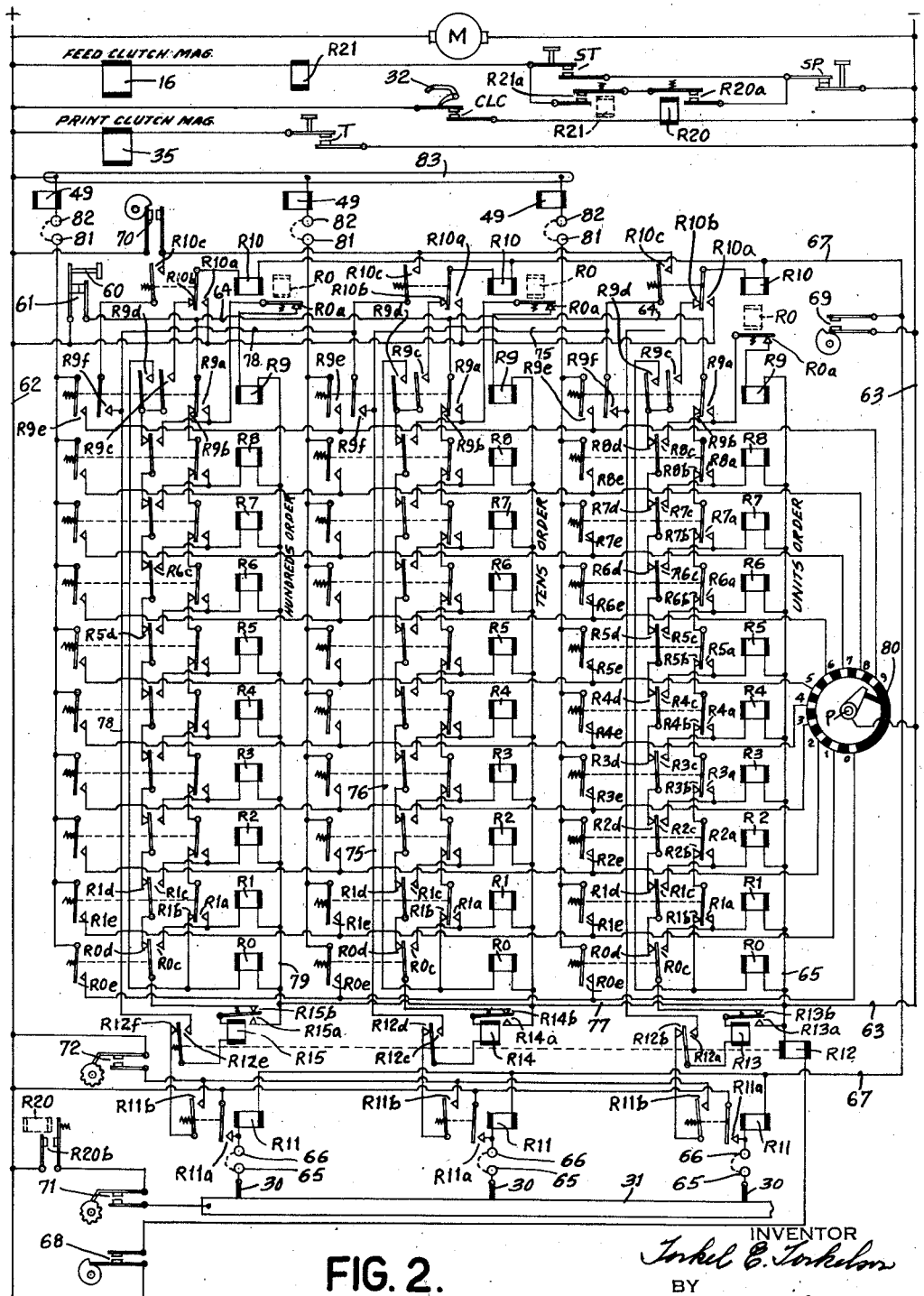
Fig. 2 is a circuit diagram of the machine including accumulator circuits in detail together with the general operating circuits of the machine.

A detailed description of the machine shown in Fig. 1 will now be set forth, it being understood that the electrical accumulator forming the subject matter of the invention is not limited in its application to the machine disclosed but may be applied as well to other types of accounting machines.

Card feeding and sensing mechanism

The main drive shaft of the machine is indicated at 10 in Fig. 1 and may be driven by any suitable source of power to maintain it in constant rotation. The shaft 10 carries a gear 21 which meshes with and drives a gear 20 freely mounted on the card feed shaft F. Secured to gear 20 is a clutch driving element 19 which is consequently in constant motion. Lying in the plane of clutch element 19 is a spring-pressed dog 18 which is carried by and pivoted to a cam 22. An armature latch 17 normally holds the pawl 18 out of engagement with the driving element 19. Upon energization of magnet 16, latch 17 is rocked counterclockwise to release pawl 18 whereupon a spring moves it into engagement with the driving element 19 to cause rotation of cam 22.

The cam 22 is secured to shaft F so that the shaft rotates in unison with the driving element 19. Cam 22, as it rotates, rocks a bell crank follower lever 23 and, through a link 24, oscillates arms 25 which have pin and slot connections with a card picker 26 which is suitably mounted for vertical reciprocation. The downward movement of picker 26 advances a card C from the feed magazine 27 to the uppermost pair of feed rollers 28 which continue the downward movement of the card to further pairs of feed rollers 28. The several pairs of feed rollers are interconnected by gears generally designated 29 and are driven by a suitable gear secured to the shaft F so that the rollers 28 are in motion during the rotation of shaft F.

The record cards C are placed in the magazine 27 so that the index point positions of the cards pass the sensing station which comprises individual sensing brushes 30 and common contact roller 31 in the order "9," "8," "7," "6," "5," "4," "3," "2," "1," and "0" (Fig. 5). For each revolution of shaft F, a record card is advanced from the hopper to a position shown in Fig. 1 in which brushes 30 are about to sense the "9" positions of the card.

As the cards advance toward the sensing position, they engage and rock a pivoted card lever 32 which causes the closure of card lever contacts designated CLC. The function of the card lever contacts in causing the cards to continuously feed is fundamental in the art and is readily seen from the machine circuit diagram which will be presently described. The cards on leaving the sensing station are carried by additional feed rollers 28 to receptacle 33.

*General machine circuits*

The motor M is connected across the line so as to be continuously running. When start key ST is depressed, a card feed cycle is initiated because of the energization of the card feed clutch magnet 16 by a simple circuit from positive line 62, feed clutch magnet 16, start relay R21 coil, contacts of start key ST now closed, normally closed contacts of stop key SP, to negative line 63. In order to cause the cards to continuously feed after the start key is released, card lever contacts CLC are closed by the card as it passes down to the sensing station as previously described, and card lever relay R20 is thereby energized closing contacts R20a. A holding circuit is thereby established for the feed clutch magnet 16 as long as cards are feeding which may be traced from positive line 62, feed clutch magnet 16, start relay R21 coil, contacts R21a and contacts R20a both now closed, normally closed contacts of the stop key SP, to negative line 63. This circuit may be broken at any time by the depression of the stop key and thus cause the card feed mechanism to be halted for the purpose of placing additional cards in the hopper or for taking totals from the accumulators. Obviously, the circuit will be automatically broken when the cards run out or fail to feed, since contacts CLC will open causing relay R20 to become deenergized.

In addition to contacts R20a, the card lever relay R20 is provided with other contacts R20b located in the circuit comprising circuit breaker contacts 71 and common contact roll 31. The purpose of contacts R20b is to prevent the sending of impulses by circuit breaker 71 except when cards are feeding. This eliminates the possibility of false entry circuits being set up when feed cycles are initiated by the start key and the analyzing brushes are resting on the common contact roll.

The above machine circuits are fundamental in the tabulating art and further explanation of them is therefore deemed unnecessary.

*Accumulating mechanism*

The accumulator comprises a series of ten relays one for each digit in an order and electrical circuits connected thereto such as disclosed in the circuit diagram (Fig. 2). In this diagram, an accumulator having three columns or orders is shown as representative, it being understood that more orders may be provided as the case necessitates to accommodate numbers having higher denominational orders. The three orders shown are the units, tens and hundreds orders respectively and will be referred to as such in the specific description of the accumulator which follows.

First considering the accumulator before any values have been entered therein, the zero relays R0 of each order are maintained energized to indicate a zero reading of the accumulator. The circuit to maintain relay R0 in the units order, which is similar to that for relay R0 in each of the other orders is as follows: positive line 62, reset contacts 61, conductor 64, contacts R9b to R1b in their normal positions, R0 coil, conductor 65, to negative line 63. Thus the R0 coil is held energized and consequently contacts R0c are closed to prepare for the energization of the R1 relay on the first impulse entered into each denominational order.

For purposes of explanation, assume that the first record card to reach the sensing station has value designations representing an amount of "678" to be entered into the accumulator (Fig. 5).

Taking first the units order, as the record card is fed down so that the "8" designation passes under a brush 30 at the sensing station, a circuit is completed to condition the units order of the accumulator for entry of a value of "8" therein. This preparatory circuit is as follows: positive line 62, card lever relay contacts R20b now closed, circuit breaker contacts 71, common contact roll 31, "8" designation on the record card, brush 30, jack 65, plug wire to jack 66, relay coil R11, conductor 67, cam contacts 69 to negative line 63. Relay coil R11 becomes energized closing its R11a contacts which then provide a holding circuit to maintain coil R11 energized. Contacts R11b are also closed at the same time which, in the case of an "8" designation on the record card, is at "8" in the card feed cycle. The closing of contacts R11b conditions the entry circuit to the units order so as to permit circuit breaker contacts 72 to impress eight consecutive impulses upon it, this being the number of impulses emitted by contacts 72 in the remaining portion of the cycle in which the entry circuit was conditioned. It will be noted that circuit breaker contacts 72 are adapted to emit 9 impulses per cycle, representing nine digit value increments each having a unit value, but the number of impulses actually impressed on an entry circuit depends upon the differential time in the cycle at which said entry circuit became conditioned, which in turn is dependent upon the position of the sensed value designation on the record card. In order to provide some time for the conditioning of the entry circuit as explained above, the timing of circuit breaker contacts 72 has been delayed slightly from the actual index point positions of the card feed cycle as may be seen in the timing chart (Fig. 3).

To continue with the example, upon the first of eight impulses to be sent to the units order, relay R1 is energized by a circuit from positive line 62, circuit breaker contacts 72, contacts R11b now closed, contacts R12b, relay coil R13, contacts R13b, contacts R0c now closed, relay coil R1, to negative line 63. Upon the energization of relay R1, the previously described holding circuit for relay R0 is broken by the opening of contacts R1b. However, contacts R1b are paired up with contacts R1a so as to become "make before break" contacts, that is, contacts R1a make before contacts R1b break thereby concurrently providing a maintaining circuit for relay R1 subject to be broken by the next impulse entered. This circuit is similar to that for the R0 coil and may be traced from positive line 62, key contacts 61, conductor 64, contacts R9b to R2b, contacts R1a, relay coil R1, conductor 65 to negative line 63.

It might be well to mention at this point that relay R13, which was energized by the first impulse impressed on the entry circuit, is of such construction that its time of operation is slightly longer than that for any of the relays R0 to R9. The purpose of this relay is to prevent a faulty condition which might arise if, for example, the card feeding mechanism was slowed up considerably thereby increasing the duration of the impulses sent to the accumulator to the point where one impulse might cause the energization of more than one relay. To prevent the above condition, relay R13, upon being energized by an impulse, provides a predetermined cut-off time regardless of the duration of that impulse. Consequently, no special synchronized relation of the impulses is necessary for correct operation of the accumulator. Contacts R13a and R13b of relay R13 are of the "make before break" type already described and therefore when this relay is energized a brief holding circuit is established through its contacts as follows: positive line 62, circuit breaker contacts 72, contacts R11b, relay coil R13, contacts R13a, to negative line 63. This circuit will be broken as soon as circuit breaker contacts 72 open, causing coil R13 to become deenergized once again so that the entry circuit will be established through R13b for the next impulse sent from the circuit breaker contacts 72.

The circuit for the second impulse will then be from positive line 62, breaker contacts 72, contacts R11b, contacts R12b, relay coil R13, contacts R13b now back in their normal position, contacts R0d, contacts R1c, relay coil R2, conductor 65 to negative line 63. A holding circuit for relay R2 is provided similar to that already described for R0 and R1.

Like circuits are established and broken by the impulses which follow. After 8 successive impulses, relay 8 becomes energized. Because of the fact that the pairs of contacts with common center straps associated with relays of the accumulator are of the "make before break" type, a maintaining circuit is provided for each relay energized, and, upon energization of the next higher relay in the series, this circuit is, in effect, shifted to maintain the latter relay energized, as a result of which the former relay becomes deenergized. That is, upon energization of relay R3, for example, relay R2 becomes deenergized and relay R3 is maintained energized until relay R4 is energized, etc. After the eighth impulse, relay R8 will be maintained energized until the next sensing cycle and thus signifies an entry of "8" from the record card into the units order. The number of repeated circuit operations is, obviously, dependent upon the number of impulses emitted from circuit breaker contacts 72 which follow the sensing of the value designation on the record card.

Similar operations take place in the same cycle and in like manner in the tens and hundreds orders, thus entering "7" and "6" respectively in these orders. At this point, then, an amount of "678" is standing in the accumulator as denoted by an energized relay in the hundreds, tens, and units orders.

Now assume that the next record card has an amount of "25" to be read from it and that it is desired that this amount be added to the "678" already standing in the accumulator. In the units order the five impulses following the sensing of a "5" designation on the record card will energize R9, R0, R1, R2, and R3 relays in a manner already described. It will be noted that a pair of contacts R0a are provided in series with the R9 coil so that upon energization of relay R0, contacts R0a will open and break the holding circuit for relay R9. In the tens order the two impulses following the reading of "2" in the card will energize successively the R8 and R9 relays. In the hundreds order relay R6 remains energized, there being no direct entry from the second card to be made in this position.

The impulse following the energization of relay R9 in the units order will cause carry relay R10 to be energized as follows: positive line 62, circuit breaker contacts 72, contacts R11b, contacts R12b, relay coil R13, contacts R13b through contacts R0d to R8d, contacts R9c now closed, contacts R10b, carry relay coil R10, conductor 67, cam contacts 69, to negative line 63. Thus, carry relay R10 is energized and operates its contacts R10a which are designed to close before its other contacts R10b open so as to provide a holding circuit for this relay. In the tens order, R9 being the last relay energized, a contact R9f is closed which permits the carry impulse to add one in all orders standing at "9" immediately to the left of the order in which the carry impulse was initiated. In the particular example selected, after the adding portion of the cycle the amount represented by the accumulator would be "693" as a partial sum of "678" and "25." Then during the carry portion of the cycle, an electrical carry impulse is initiated in the units order because, while adding, this order passed through "9" and "0." This carry impulse is directed to add one in the tens order and by means of contact R9f this same impulse will cause one to be added to the hundreds order to give the correct total of "703."

In order that the above carry entries can be made into the tens and hundreds orders, the carry entry circuit to these columns must be conditioned by the energization of relay coil R12 through cam contacts 68 which make just after the completion of the adding portion of the cycle (Fig. 3). It will be noted that, upon energization of the R12 relay, contacts R12b, R12d, and R12f open and thus provide a cut-off to prevent any further impulses from circuit breaker contacts 72 from entering the accumulator orders during the remainder of that particular cycle.

Following the energization of relay R12, the carry entry circuit by which the addition of one is made in the tens order is completed by an impulse from carry cam contacts 70 as follows: positive line 62, carry cam contacts 70, carry relay contacts R10c now closed, via conductor 75 to contacts R12c also closed, relay coil R14, contacts R14b, contacts R0d to R8d and R9d in the tens order, via conductor 76 to coil R0 in the tens order, conductor 77, to negative line 63. At the same time, since the R9 relay of the tens order was left energized at the end of the adding portion of the cycle, a carry entry circuit is also completed to the hundreds order as follows: same as for the tens order to conductor 75, then through contacts R9f in the tens order, conductor 78, contacts R12e now closed, relay coil R15, contacts R15b, contacts R0d to R5d, contacts R6c now closed, relay coil R7, conductors 79 and 77 to negative line 63.

As a result of the above circuit operations, the true total of 703 is accumulated for the entries of 678 and 25 from successive cards passing the sensing station. Obviously, any amounts may be arranged to be accumulated by providing a sufficient number of denominational orders in the accumulator, the amounts chosen for the specific example being sufficient to bring out the principles of operation of the strictly electrical accumulator disclosed.

Printing mechanism

The printing mechanism is operated from a shaft designated P upon which is freely mounted a gear 20a to which is secured clutch driving element 38. Cooperating with element 38 is a spring-pressed pawl 37 which is carried by a cam 39 secured to shaft P. Supported by and pivoted to the cam 39 is an armature latch 36 which normally holds the pawl 37 out of engagement with driving element 38. Energization of clutch magnet 35 causes the latch 36 to release pawl 37 for engagement with driving element 38 whereupon shaft P is caused to rotate.

Cam 39 cooperates with a follower lever 40 attached to shaft 41. Arms 42 are also secured to shaft 41 and have a bar 43 extending between their extremities. Bar 43 controls the movement of the type carriers 44 which carry type elements 45 past the printing position opposite platen 46. As the type carriers 44 move upwardly, notches 47 pass the nose of stopping pawl 48 in succession. During such movement, energization of print selecting magnet 49 attracts its armature 49a to trip pawl 48 into engagement with one of the notches 47, the notch selected depending upon the time of energization of magnet 49. Where a type bar 44 is not positioned for printing a digit, the lowermost type element will advance beyond the printing position.

For each type carrier there is provided a pivoted hammer 52 normally latched in the position shown by latch 52a. Extending across the latches is a bail 51 pivoted at 51a and having arm and link connection 50 to the arm 42 at a point on the arm between shaft 41 and rod 43. The proportion of parts is such that as arm 42 moves clockwise, bail 51 will move in the same direction and near the extremity of the movement of arm 42, the bail will rock latches 52a clockwise to release the hammers 52.

Total taking from the accumulators is accomplished by means of a total print emitter and total print contacts associated with the accumulator relays to allow circuits to be established between the total print emitter and the print magnets. The emitter, designated as 80 in Fig. 2, is secured to the print shaft P and consequently remains stationary except during a total taking cycle.

In order to initiate a total cycle, total key T is depressed and causes print clutch magnet 35 to become energized by means of a simple circuit from positive line 62, print clutch magnet 35, contacts operated by total key T now closed, to negative line 63. The energization of clutch magnet 35 causes shaft P to turn in a manner already described. The print emitter 80 therefore also turns and sends out timed impulses over the various established total print circuits from the accumulators.

The total print circuit from an accumulator is as follows: negative line 63, emitter 80, contacts e of the energized relay (any one from R0e to R9e) of a given accumulator column, jack 81, jack 82, print magnet 49, common conductor 83 to positive line 62. Assume that the accumulator column has a "3" standing in it, then, on total taking, a circuit would be completed at a predetermined time in the cycle from the "3" segment of the emitter through the R3e contacts to a print magnet 49.

After the total has been printed, the accumulator may be reset to zero by depressing reset key 60 to open key contacts 61. Immediately upon the opening of these contacts the holding circuits to all accumulator relays are broken; and upon the release of the reset key, contacts 61 close once more to establish holding circuits to all R0 relays of the accumulator, thereby indicating zero amounts standing therein. These holding circuits have been previously described in detail in connection with the explanation of the accumulator circuits. It will be noted that no mechanical drive is necessary, that the resetting action is instantaneous, and that the energization of the relays R0 is automatic upon release of the reset key.

Summary of operation

It has now been shown how, upon the sensing of differential value designations on a record, a plurality of impulses corresponding to each of the sensed values are entered into the various orders of the accumulator to energize successively a series of relays in each of said orders, the number of relays energized in an order corresponding to the number of impulses entered into that order. Each relay in a series, upon being energized, prepares the next higher relay for energization and concurrently breaks the holding circuit for the previous relay in the series. Means is provided to maintain the last-operated relay in each series energized until the next higher relay in the series becomes energized. Contacts associated with the relays condition circuits for total printing amounts standing in the accumulator as represented by the last relay energized in each denominational orders. A simple electrical resetting means is provided to clear amounts instantaneously from the accumulator at any desired time.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In an accounting machine controlled by a record, means to sense a value representation on said record, circuit means including a circuit interrupter for initiating differentially timed periodic impulses and a circuit-closing switch, value manifesting or accumulating means comprising a series of relays and variable entry circuit means therefor, means controlled by the sensing means at a differential time in accordance with the sensed value for closing the switch to render the circuit interrupter effective to cause a predetermined number of the initiated impulses representative of the sensed value to be impressed on the variable entry circuit means so as to energize the relays in sequence according to the number of impulses so impressed, variable holding circuit means for holding the last energized relay in its operated condition and being arranged to energize and hold the first relay of the series energized should no other relay in the series be energized and each relay, upon being energized, controlling the variable entry circuit means to condition the next relay in the series for energization and concurrently rendering the holding circuit means for the previous relay ineffective.

2. In an accounting machine controlled by a record, means to analyze said record for value representations, a control circuit including repeatedly operating contact means for initiating a plurality of differentially timed periodic impulses during a predetermined time interval, value manifesting or accumulating means comprising a series of relays and variable entry circuit means therefor, means controlled by the analyzing means upon analysis of a value representation for conditioning the control circuit at a differential time to render the contact means effective to cause a predetermined number of the initiated impulses during said time interval to be impressed on the variable entry circuit means to energize the relays in sequence according to the number of impulses so impressed, variable holding circuit means for holding the last energized relay in its operated condition and arranged to energize and hold the initial relay of the series energized in the event that no other relay is energized, and each relay, upon being energized, controlling the variable entry circuit means so as to condition the next relay in the series for energization and concurrently controlling the variable holding circuit means so as to render the previous relay ineffective.

3. In an accounting machine controlled by a record, means to analyze said record for value designations thereon, circuit means including a cyclically operating circuit controller for setting up a plurality of differentially timed periodic impulses during a cycle, value manifesting or accumulating means comprising a series of relays and shiftable entry circuit means therefor, means controlled by the analyzing means upon analysis of a value designation for rendering said circuit means operative at a differential time to impart a predetermined number of the impulses to the shiftable circuit entry means in succession during the cycle to energize said relays according to the number of impulses so imparted, shiftable holding circuit means for maintaining the last energized relay in its operated condition and arranged to energize and hold the initial relay in the series should no other relay in said series be energized, and each relay, upon being energized, shifts the entry circuit means so as to condition the next relay in the series for energization and concurrently shifts the holding circuit means so as to render the previous relay ineffective.

4. In an accounting machine controlled by a record, means to sense a digit value designation on said record, an impulse circuit including means to initiate differentially timed periodic impulses, accumulating means comprising a series of electromagnets one for each digit value, variable entry circuit means for said series of magnets, means under control of the sensing means for coupling said entry circuit means with said impulse circuit at a differential time in accordance with the sensed value so as to render the impulse initiating means effective to impress a succession of impulses of a fixed number representing the digit value on the entry circuit means to energize said magnets in accordance with the number of impulses so impressed, contacts controlled by each of said magnets upon becoming energized by one of said impulses for varying said entry circuit means to condition the next magnet in the series for operation upon occurrence of the next impulse, and other contacts also under control of each of the magnets upon becoming energized for maintaining one and only one magnet of the series energized at a time, the last mentioned contacts automatically providing for energization of the initial magnet of the series should no other magnet be energized.

5. In an accounting machine controlled by a record, means to sense a digit value designation on said record, an impulse circuit including a circuit interrupter for initiating differentially timed periodic impulses, accumulating means comprising a series of electromagnets one for each digit value, shiftable entry circuit means for said series of magnets, means under control of the sensing means for coupling said entry circuit means with the impulse circuit when the value designation is sensed so as to render the circuit interrupter effective at a differential time for impressing a succession of impulses on the entry circuit means, dependent in number upon the sensed value designation, to energize said magnets in accordance with the number of impulses so impressed, contacts controlled by each of said magnets upon becoming energized by one of said impulses for shifting the entry circuit means so as to energize the next magnet in the series upon occurrence of the next impulse, and other contacts also under control of each of the relays upon becoming energized for maintaining one and only one magnet of the series energized at a time, the last mentioned contacts being arranged automatically to energize the initial magnet of said series should no other magnet be energized.

6. In an accounting machine controlled by a record, means to analyze said record for digit value designations thereon, an impulse circuit including a circuit interrupter for effecting a succession of periodic impulses during a predetermined time interval, accumulating means comprising a series of fast energizing electromagnets one for each digit value, changeable entry circuit means including a relatively slow-to-energize magnet and normally closed contacts for controlling entry into said series of magnets adapted to be operatively connected to one of said magnets at a time, means under control of the analyzing means for coupling the entry circuit means with the impulse circuit upon analysis of a value designation so as to render the circuit interrupter effective at a differential time to impress a predetermined fixed number of impulses on the entry circuit means in acordance with the analyzed value to energize the magnets of said series in accordance with the number of impulses so impressed, the magnet of the entry circuit means being energized upon each impulse to bring about the opening of the normally closed contacts to limit the duration of said impulse so as to prevent more than one relay of the series from being energized for each impulse, contact switches controlled by each of the magnets of the series as each becomes energized by one of said impulses for changing the connection of the entry circuit means to the next magnet of the series and other contact switches also under control of each of the relays as each becomes energized for maintaining one and only one relay of the series energized at a time.

7. In an accounting machine controlled by a record, means to analyze said record for digit value designations thereon, an impulse circuit including cyclically-operating contact means for effecting a succession of periodic impulses during a cycle, accumulating means comprising a series of fast energizing electromagnets one for each digit value, switchable entry circuit means for said series of magnets adapted normally to have operative connection with one of said magnets at a time and including a relatively slow-to-energize magnet and normally closed contacts, means under control of the analyzing means for coupling the entry circuit means with the impulse circuit upon analysis of a value designation so as to render the contact means effective at a differential time to impress a predetermined fixed number of impulses on the entry circuit means during said cycle in accordance with the analyzed value to energize said series magnets in accordance with the number of impulses so impressed, the magnet of the entry circuit means being energized upon each impulse to bring about the opening of the normally closed contacts to limit the duration of said impulse so as to prevent more than one relay of the series from being energized for each impulse, switch means actuated by each of said series magnets as each becomes energized by one of said impulses for switching said entry circuit means so as to condition the next magnet in the series for operation upon occurrence of the next impulse, and other switch means also under control of each of the magnets of the series operated concurrently with the first mentioned switch means for maintaining one and only one magnet of the series energized at a time, the last mentioned switching means being arranged automatically to energize the initial magnet of the series in the event that no other magnet of said series is energized.

8. In an accounting machine controlled by a record, means to analyze said record for digit value designations thereon, an impulse circuit including a circuit controller for setting up a constant number of differentially timed periodic impulses during a predetermined time interval, accumulating means comprising a series of fast operating electromagnets one for each digit value, switchable entry circuit means for said series of magnets adapted to be operatively connected to one of said magnets at a time and including therein a control magnet and a pair of normally closed contacts, means under control of the analyzing means upon analysis of a value designation for coupling the entry circuit means with the impulse circuit at a differential time dependent upon the magnitude of the digit value so as to cause impulses set up by the circuit controller thereafter until the end of the predetermined time interval to be impressed on the entry circuit means to energize said series magnets in accordance with the number of impulses so impressed, the control magnet of the entry circuit means becoming energized upon each impulse to break the electrical coupling between the entry means and the impulse circuit so as to definitely limit the duration of an impulse to prevent more than one relay being energized for each impulse, switch means actuated by each of said series magnets as each becomes energized by one of said impulses for switching said entry circuit means so as to condition the next relay in the series for operation upon occurrence of the next impulse, and other switch means also under control of each of the series magnets operated concurrently with the first mentioned switching means for maintaining one and only one relay of the series energized at a time, the last mentioned switch means being arranged automatically to effect energization of the initial magnet of the series in the event that no other of the circuit magnets is energized.

9. In an accounting machine of the character described, means including a circuit interrupter for transmitting impulses representing like increments of digit values, accumulating means comprising a series of relays, one for each digit value, shiftable entry circuit means for said series of relays, means to couple the entry circuit means with the circuit interrupter to impress on said entry circuit means a fixed number of the emitted impulses corresponding to a digit to be entered into the accumulating means so as to successively energize a corresponding number of relays therein, and means controlled by each of said relays as each becomes energized for shifting the entry circuit means to condition the next higher relay in the series for energization, and further means controlled by each of said relays to concurrently render the previous relay in said series ineffective comprising a shiftable holding circuit for maintaining the last energized relay in its operated condition, said circuit also being effective to energize and hold the first relay of the series should no other relay be energized.

TORKEL E. TORKELSON.